United States Patent
Suteerawanit

(10) Patent No.: US 7,310,907 B2
(45) Date of Patent: Dec. 25, 2007

(54) MULTI-INSECT TRAP

(76) Inventor: Nick Han Suteerawanit, 10811 Sherman Way, Sun Valley, CA (US) 91352-4829

( * ) Notice: Subject to any disclaimer, the term of this patent is extended or adjusted under 35 U.S.C. 154(b) by 0 days.

(21) Appl. No.: 11/323,046

(22) Filed: Dec. 30, 2005

(65) Prior Publication Data
US 2007/0151142 A1 Jul. 5, 2007

(51) Int. Cl.
*A01M 1/10* (2006.01)
(52) U.S. Cl. .............................. 43/122; 43/121; 43/107
(58) Field of Classification Search ................. 43/107, 43/121, 122
See application file for complete search history.

(56) References Cited

U.S. PATENT DOCUMENTS

| | | | | |
|---|---|---|---|---|
| 1,666,509 A | * | 4/1928 | Schlossareck | 43/122 |
| 5,406,743 A | * | 4/1995 | McSherry et al. | 43/122 |
| 5,522,171 A | * | 6/1996 | Mandeville | 43/122 |
| 5,685,109 A | * | 11/1997 | Rimback | 43/122 |
| 5,749,168 A | * | 5/1998 | Chrysanthis | 43/122 |
| 2001/0042338 A1 | * | 11/2001 | Jackson | 43/121 |

* cited by examiner

*Primary Examiner*—Kurt Rowan
(74) *Attorney, Agent, or Firm*—A. Justin Lum; Raymond Y. Chan; David and Raymond Patent Group

(57) ABSTRACT

A multi-insect trap is capable of capturing a predetermined kind of insects, while preventing other undesirable insects from entering into the trap. The multi-insect trap includes a trap housing, an insect guider, and an ant isolation arrangement. The insect guider includes an attractant carrier supported within the trapping chamber and a plurality of cone-shaped guiding channels spacedly and inwardly extended from the surrounding wall for guiding the insect to enter into the trapping chamber. The ant isolation arrangement has two ant boundaries provided on a top ceiling and a bottom seat of the trap housing respectively, wherein the two ant boundaries are adapted for being filled with liquid as two ant resisting borders respectively for preventing ants to reach the surrounding wall so as to stop the ants from entering into the trapping chamber through the guiding channels.

2 Claims, 4 Drawing Sheets

MULTI-INSECT TRAP

BACKGROUND OF THE PRESENT INVENTION

1. Field of Invention

The present invention relates to an insect trapping device, and more particularly to a multi-insect trap which is capable of capturing a predetermined kind of flying insects, such as yellow jackets, flies, moths, beetles etc., while preventing other undesirable insects, such as ants, from entering into the trap.

2. Description of Related Arts

Referring to FIG. 1 of the drawings, a conventional insect trap, such as a yellow jacket trap, usually comprises a trap housing 10P having a trapping chamber 11P, and at least one insect guider 20P provided on the trap housing 10P and communicating the trapping chamber 11P with an exterior thereof such that insects, such as yellow jackets, are allowed to fly into the trapping chamber 11P via the insect guider 20P.

Specifically, the insect guider 20P has a cone-shaped guiding channel 21P formed on the trap housing 10P for allowing insects to pass through so as to enter into the trapping chamber 11P. Very often, the trap housing 10P carries a predetermined amount of insect attractant which is capable of generating attractive smell for attracting particular kinds of flying insects to enter into the trapping chamber 11P via the insect guider 20P.

Referring to FIG. 1 of the drawings, the trap housing 10P is usually suspendedly hung onto a fixture wherein the cone-shaped guiding channel 21P is formed at a bottom side of the trap housing 10P such that the insects, such as the yellow jackets, are attracted to fly into the trapping chamber 11P while the trap housing 10P is being hung on that fixture.

One traditional problem for this kind of conventional insect trap is that while it is effective in attracting flying insects, such as yellow jackets, it is also effective in attracting other unwanted insects, notably ants. This is largely due to the effect of a strong performance of the attractant carried within the trapping chamber 11P.

Therefore, one skilled in the art may find that an insect trap, such as the above-mentioned conventional insect trap for trapping bees, invites, apart from yellow jackets (which are desirable), a considerable number of ants as well. In many occasions, where the insect trap is hung from a fixture, the ants climb from the fixture down to the trap housing 10P and enter into the trapping chamber 11P via the insect guider 20P. These ants are extremely annoying because, once they have entered into the trapping chamber 11P, it is very difficult to remove them without affecting the yellow jackets.

In many occasions, the conventional insect trap may also have a plurality of ventilating vents formed on the trap housing 10P. In these situations, it is even easier for the ants to enter the trapping chamber 11P via the ventilating vents so that the problem will definitely become more severe.

SUMMARY OF THE PRESENT INVENTION

A main object of the present invention is to provide a multi-insect trap which is capable of capturing a predetermined kind of flying insects, such as yellow jackets, flies, moths, beetles etc., while preventing other undesirable insects, such as ants, from entering into the trap.

Another object of the present invention is to provide a multi-insect trap comprising an ant isolation arrangement which is adapted to stop ants from entering into the multi-insect trap by crawling on the ground or on a physical object, such as a tree on which the multi-insect trap is hanging.

Another object of the present invention is to provide a multi-insect trap which is adapted for use by hanging on a fixture, such as a tree, as well as standing on a ground surface, wherein the ant isolation arrangement is capable of preventing ants from entering the multi-insect trap in both of these applications.

Another object of the present invention is to provide a multi-insect trap which is simple, easy to use and does not alter any conventional working principles of the conventional insect traps so as to facilitate widespread application of the present invention.

Another object of the present invention is to provide a multi-insect trap which does not involve complicated mechanical or chemical components for trapping insects, while capable of effectively preventing ants from entering. Thus, the present invention can be manufactured at a low cost so as to keep the ultimate selling price low as well.

Accordingly, in order to accomplish the above objects, the present invention provides a multi-insect trap, comprising:

a trap housing comprising a top ceiling, a bottom seat and a surrounding wall extended from the top ceiling to the bottom seat to form a trapping chamber within the top ceiling, the bottom seat and the surrounding wall;

an insect guider which comprises an attractant carrier supported within the trapping chamber and a plurality of cone-shaped guiding channels spacedly and inwardly extended from the surrounding wall for guiding the insect to enter into the trapping chamber; and an ant isolation arrangement having two ant boundaries provided on the top ceiling and the bottom seat of the trap housing respectively, wherein the two ant boundaries are adapted for being filled with liquid as two ant resisting borders respectively for preventing ants to reach the surrounding wall so as to stop the ants from entering into the trapping chamber through the guiding channels.

These and other objectives, features, and advantages of the present invention will become apparent from the following detailed description, the accompanying drawings, and the appended claims.

DETAILED DESCRIPTION OF THE PREFERRED EMBODIMENT

Figure 1:
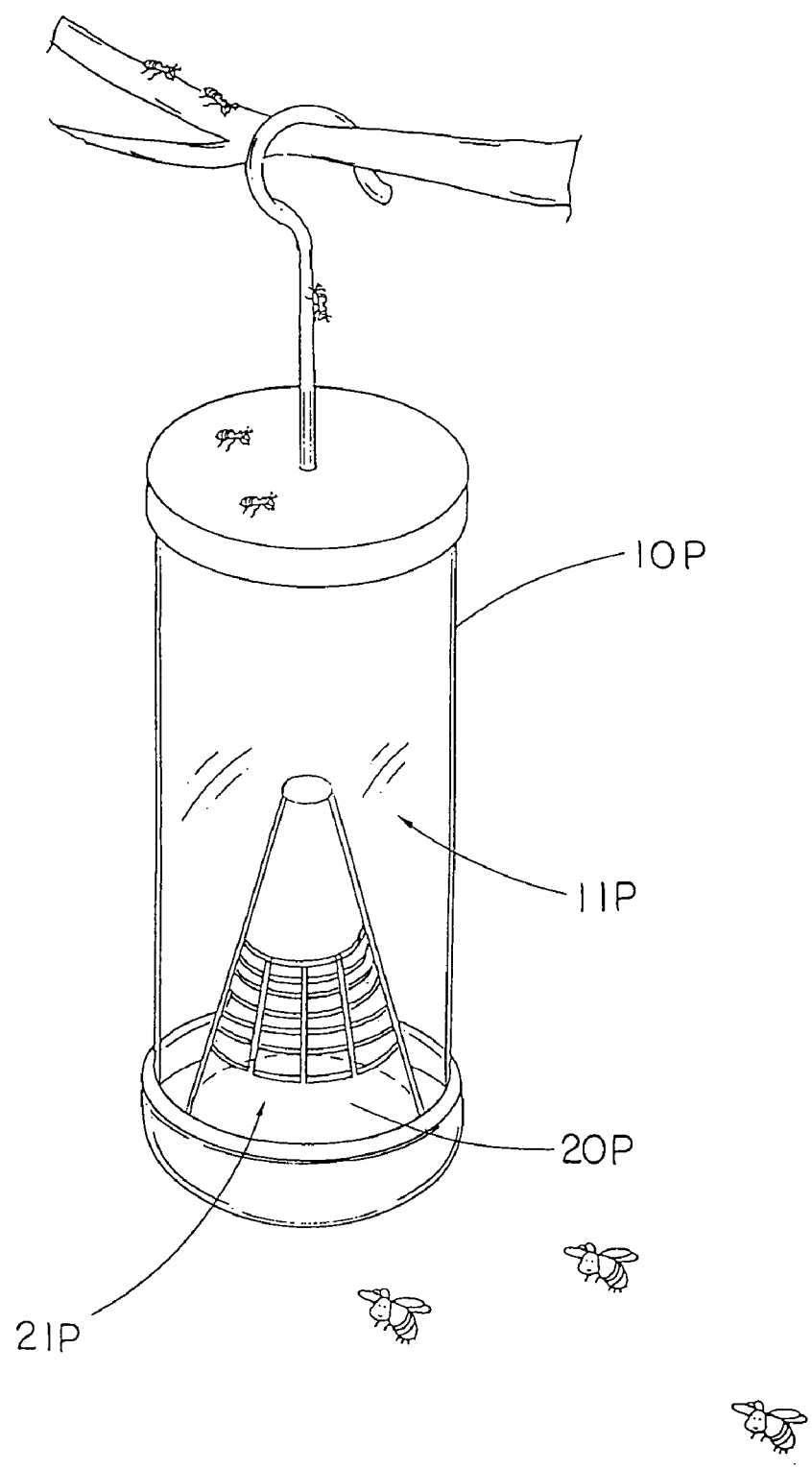
FIG. 1 is perspective view of a conventional insect trap.
Figure 2:
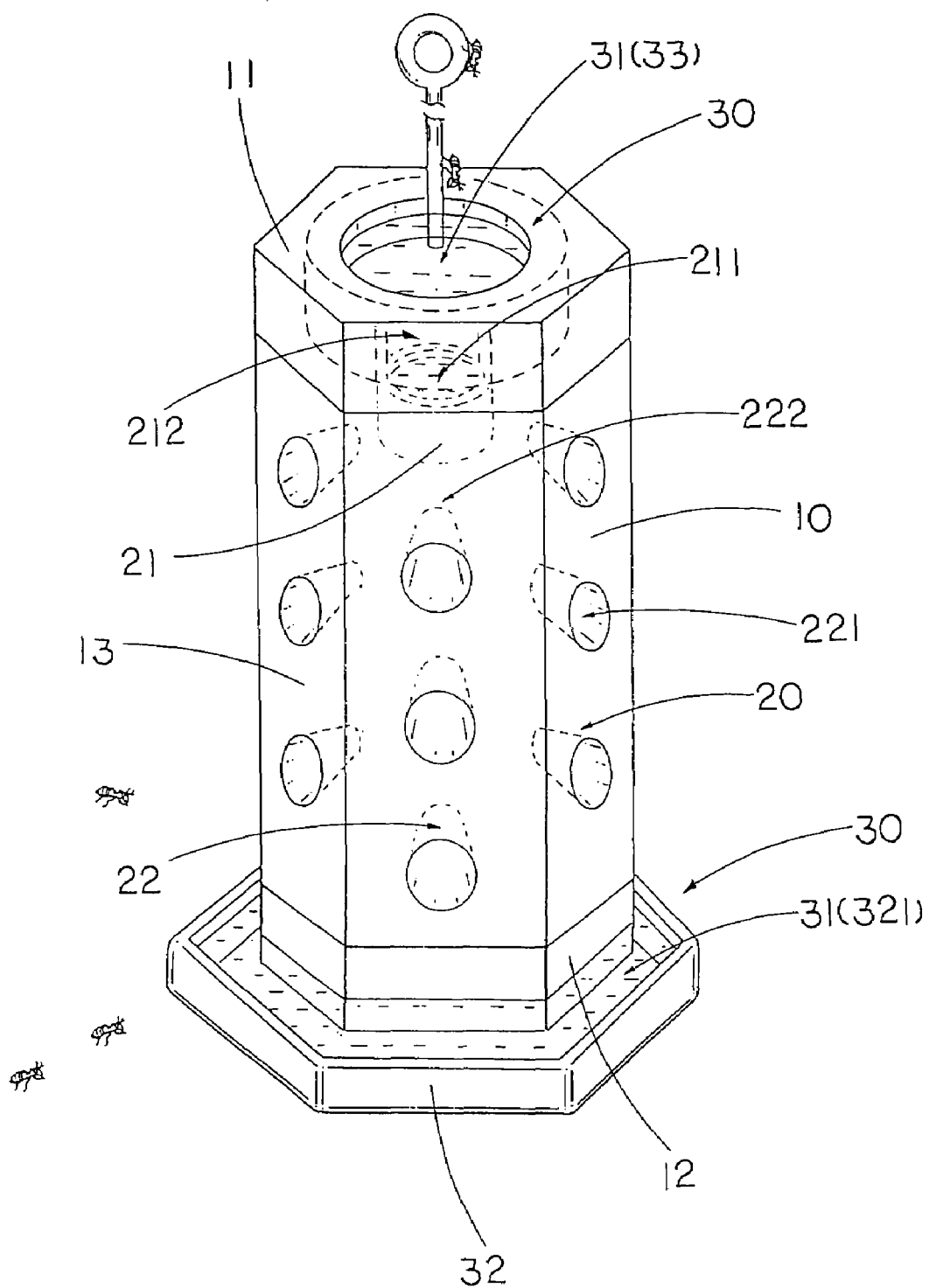
FIG. 2 is a perspective view of a multi-insect trap according to a preferred embodiment of the present invention.
Figure 3:
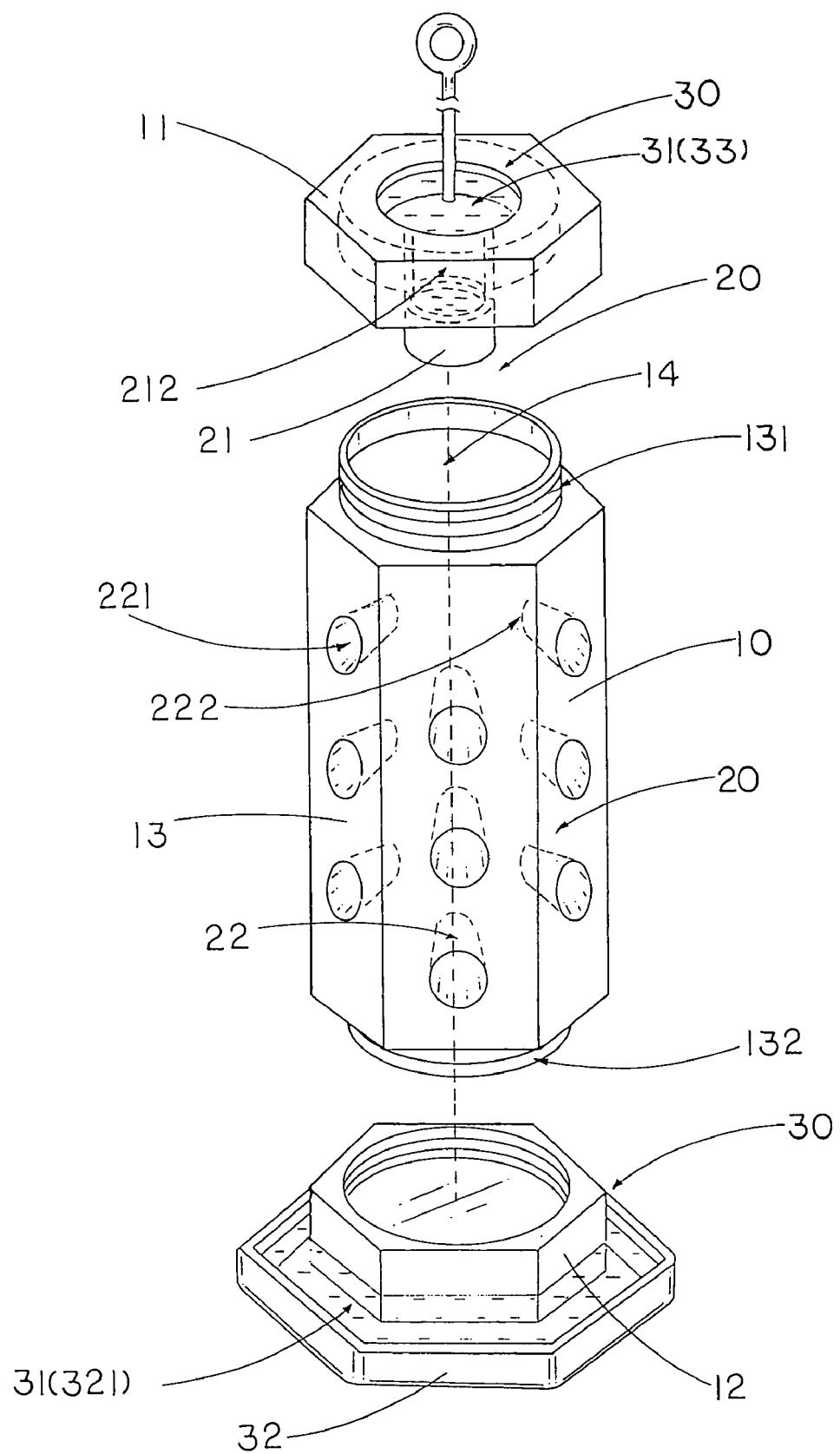
FIG. 3 is an exploded perspective view of the multi-insect trap according to the above preferred embodiment of the present invention.

Referring to FIG. 2 to FIG. 3 of the drawings, a multi-insect trap according to a preferred embodiment of the present invention is illustrated. The multi-insect trap, which is used for trapping insects, such as yellow jackets, comprises a trap housing 10, an insect guider 20, and an ant isolation arrangement 30.

The trap housing 10 comprises a top ceiling 11, a bottom seat 12 and a surrounding wall 13 extended from the top ceiling 11 to the bottom seat 12 to form a trapping chamber 14 within the top ceiling 11, the bottom seat 12 and the surrounding wall 13.

The insect guider 20 comprises an attractant carrier 21 supported within the trapping chamber 14 and a plurality of cone-shaped guiding channels 22 spacedly and inwardly extended from the surrounding wall 13 for guiding the insect to enter into the trapping chamber 14.

The ant isolation arrangement 30 has two ant boundaries 31 provided on the top ceiling 11 and the bottom seat 12 of the trap housing 10 respectively, wherein the two ant boundaries 31 are adapted for being filled with liquid, such as grease, oil or water, as top and bottom ant resisting borders respectively for preventing the ants to reach the surrounding wall 13 so as to stop the ants from entering into the trapping chamber 14 through the guiding channels 22.

According to the preferred embodiment of the present invention, the trap housing 10 has a hexagonal cross section defined by the surrounding wall 13 wherein the top ceiling 11 and the bottom seat 12 also have a corresponding hexagonal cross section aligning with the surrounding wall 11 to form the trap housing 10 having the hexagonal cross section.

The attractant carrier 21 is suspendedly hung from the top ceiling 11 of the trap housing 10 within the trapping chamber 14 to replaceably contain a predetermined amount of insect attractant which is utilized for attracting predetermined kinds of insects flying into the trapping chamber 14 via the cone-shaped guiding channels 22.

Figure 4:
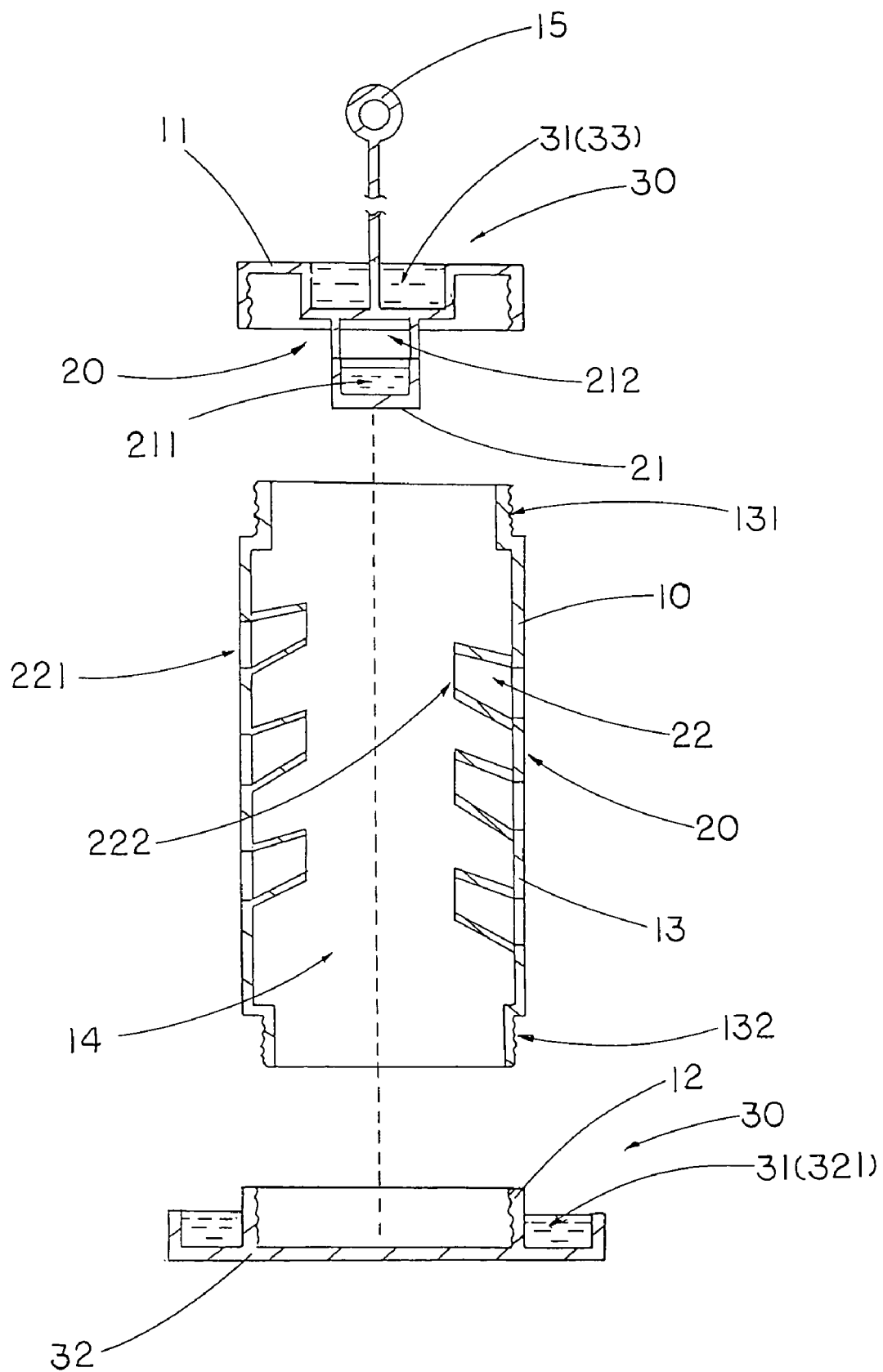
FIG. 4 is a sectional side view of the multi-insect trap according to the above preferred embodied of the present invention.

Referring to FIG. 4 of the drawings, the attractant carrier 21 is tubular in shape having a receiving cavity 211 and an attractant opening 212 communicating the receiving cavity 211 with the trapping chamber 14. The insect attractant is contained within the receiving cavity 211 to communicate with an exterior of the trap housing 10 via the attractant opening 212 and the guiding channels 22 for attracting insects flying into the trapping chamber 14.

The cone-shaped guiding channels 22 are spacedly formed on the surrounding wall 13 of the trap housing 10, wherein a cross section area of each of the guiding channels 22 is decreasing from an outer opening 221 thereof to an inner opening 222 of the respective guiding channel 22, wherein the insects are allowed to fly into the guiding channel 22 via the outer opening 221 and reach the trapping chamber 14 through the inner opening 222. Accordingly, the outer opening 221 of the guiding channels 22 are formed on the surrounding wall 13 of the trap housing 10.

In order to enhance a guiding effect of the guiding channels 22, each of the guiding channels 22 is inwardly and upwardly extended from the respective outer opening 221 to simulate the flying path of the predetermined insects, preferably bees, so that the insects are maximally attracted to fly into the guiding channels 22 and guided to pass through the inner opening 222 for being trapped into the trapping chamber 14. In other words, each of the guiding channels 22 is extended inclinedly that the inner opening 222 is positioned above the outer opening 221 for the insect entering into the trapping chamber 14 in one-direction.

Referring to FIG. 2 and FIG. 4 of the drawings, it is worth mentioning that since each of the guiding channels 22 is inwardly extended at the trapping chamber 14, in order to prevent interference of each of the guiding channels 22 by the adjacent guiding channel 22, each of the guiding channel 22 is arranged to be disaligned with the transversely adjacent guiding channel 22 so as to maximize the number of guiding channels 22 which can be formed on the trap housing 10. It is expected that the more the guiding channels 22, the more the insects which would be attracted and trapped into the trapping chamber 14.

Referring to FIG. 2 to FIG. 4 of the drawings, the ant isolation arrangement 30 comprise a seating base 32 peripherally, integrally and outwardly extended from a bottom side edge of the surrounding wall 13 to define an isolating groove 321 as the bottom ant boundary 31 provided on the bottom seat 12 of the trap housing 10 to encirclingly surround the surrounding wall 13. The isolation groove 321 can be filled with the liquid to form the bottom ant resisting border 31 so as to prevent any ants from reaching the surrounding wall 13.

On the other hand, the ant isolation arrangement 30 further comprises an isolation pool 33 indently provided on the top ceiling 11 to form the top ant boundary 31. Likewise, the isolation pool 33 can be filled with the liquid to form the corresponding ant resisting border so as to prevent any ant from moving across the isolation pool 33.

It is then important to point out that the trap housing 10 is adapted to be suspendedly hung from a fixture, such as a tree, for optimally attracting insects flying into the trapping chamber 14. Accordingly, the trap housing 10 further comprises a hanging connector 15 upwardly extended from the top ceiling 11 within the isolation pool 33 for suspendedly connecting with a fixture. As such, any ant which attempts to crawl from the fixture to the trap housing 10 is prevented from passing through the isolation pool 33, which is expected to be the only path available in the ordinary course of event for any ant to enter into the trapping chamber 14 from the fixture when the multi-insect trap is suspendedly hanging thereto.

It is worth mentioning that in order to effectively resist ants from passing through the ant boundaries 31, a width of the isolation groove 321 and the radial diameter of the isolation pool 33 must be greater than a predetermined threshold so that they are sufficiently wide to isolate ants from passing (or possibly floating) through the ant boundaries 31.

Referring to FIG. 3 of the drawings, the top ceiling 11 and the bottom seat 12 are arranged to be detachably attached on a top edge portion 131 and a bottom edge portion 132 of the surrounding wall 13, wherein the attractant carrier 21 is capable of being withdrawn from the trapping chamber 14 for replacement of the insect attractant stored within the receiving cavity 211. In other words, the insects trapped in the trap housing 10 can be removed by disassembling the top ceiling 11 and/or the bottom seat 12 from the surrounding wall 13, while the trap housing 10 can be cleaned for recycling use.

The operation of the present invention is as follows: the multi-insect trap is adapted to be hung on a fixture, and stand on a ground surface. In either case, insects, specifically yellow jackets or other flying insects, are attracted and fly directly into the guiding channels 22 for entering into the trapping chamber 14 where the insect attractant is located. Ants, which are crawling on the ground surface or along the fixture, may be attracted as well. However, they would be effectively stopped by the ant boundaries 31 and therefore are kept out of the trapping chamber 14.

It is also worth mentioning that once the insects are flying into the trapping chamber 14, due to the conical shape of the guiding channels 22, experiences show that they are unlikely to locate a return path, though that path (via the guiding channel 22) is not closed or sealed in anyway. As a result, it is believed that the insects would ultimately be trapped within the trapping chamber 14, which is isolated from ants' interference.

From the forgoing descriptions, it can be shown that the above objects have been substantially achieved. The present invention effectively provides a multi-insect trap which is capable of capturing yellow jackets or other flying insects while preventing other undesirable insects, such as ants, from entering into the trap.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-insect trap for trapping an insect, comprising:
    a trap housing comprising a top ceiling, a bottom seat and a surrounding wall having a top edge portion extended from said top ceiling and a bottom edge portion which is integrally extended from said top edge portion and is extended to said bottom seat to form a trapping chamber within said top ceiling, said bottom seat and said surrounding wall, said trap housing further comprising a hanging connector upwardly extended from said top ceiling within said isolation pool for suspendedly hanging at a fixture, such that said ant isolation arrangement is adapted for preventing said ant passing through said isolation pool to reach said guiding channels on said surrounding wall through crawling on said hanging connector;
    an insect guider which comprises an attractant carrier supported within said trapping chamber and a plurality of cone-shaped guiding channels spacedly and inwardly extended for guiding said insect to enter into said trapping chamber, wherein each of said guiding channels has an outer opening formed on said surrounding wall of said trap housing and an inner opening extended into said trapping chamber through said surrounding wall of said trap housing; and
    an ant isolation arrangement having two ant boundaries provided on said top ceiling and said bottom seat of said trap housing respectively, wherein said two ant boundaries are adapted for being filled with liquid as top and bottom ant resisting borders respectively for preventing ants to reach said surrounding wall so as to stop said ants from entering into said trapping chamber through said guiding channels, wherein said isolation arrangement further having an isolation pool indently formed on said top ceiling to form said corresponding ant boundary, wherein said isolation pool is adapted for being filled with said liquid to form said top ant resisting border to prevent said ant from moving across said isolation pool.

2. A multi-insect trap for trapping an insect, comprising:
    a trap housing comprising a top ceiling, a bottom seat and a surrounding wall having a top edge portion extended from said top ceiling and a bottom edge portion which is integrally extended from said top edge portion and is extended to said bottom seat to form a trapping chamber within said top ceiling, said bottom seat and said surrounding wall, said trap housing further comprising a hanging connector upwardly extended from said top ceiling within said isolation pool for suspendedly hanging at a fixture, such that said ant isolation arrangement is adapted for preventing said ant passing through said isolation pool to reach said guiding channels on said surrounding wall through crawling on said hanging connector;
    an insect guider which comprises an attractant carrier supported within said trapping chamber and a plurality of cone-shaped guiding channels spacedly and inwardly extended for guiding said insect to enter into said trapping chamber, wherein each of said guiding channels has an outer opening formed on said surrounding wall of said trap housing and an inner opening extended into said trapping chamber through said surrounding wall of said trap housing;
    and an ant isolation arrangement having two ant boundaries provided on said top ceiling and said bottom seat of said trap housing respectively, wherein said two ant boundaries are adapted for being filled with liquid as top and bottom ant resisting borders respectively for preventing ants to reach said surrounding wall so as to stop said ants from entering into said trapping chamber through said guiding channels, wherein said isolation arrangement comprising a seating base peripherally, integrally and outwardly extended from a bottom side edge of said surrounding wall to form an isolating groove surrounding around said bottom edge portion of said surrounding wall, wherein said isolating groove is adapted for fill up with said liquid to form said bottom ant resisting border so as to prevent said ant from reaching said guiding channels on said surrounding wall, wherein a width of said isolation groove and a radial diameter of said isolation pool are greater than a respective predetermined threshold so that said isolation groove and said radial diameter are sufficiently wide to isolate ants from passing through the ant boundaries, wherein said isolation arrangement further has an isolation pool indently formed on said top ceiling to form said corresponding ant boundary, wherein said isolation pool is adapted for being filled with said liquid to form said top ant resisting border to prevent said ant from moving across said isolation pool.

* * * * *